(12) United States Patent
Hsieh

(10) Patent No.: US 11,825,261 B2
(45) Date of Patent: Nov. 21, 2023

(54) EARPHONE COMMUNICATION METHOD

(71) Applicant: Tiinlab Corporation, Shenzhen (CN)

(72) Inventor: Kuan-Hong Hsieh, Guangdong (CN)

(73) Assignee: TIINLAB CORPORATION, Shenzhen (CN)

( * ) Notice: Subject to any disclaimer, the term of this patent is extended or adjusted under 35 U.S.C. 154(b) by 364 days.

(21) Appl. No.: 17/332,963

(22) Filed: May 27, 2021

(65) Prior Publication Data

US 2021/0337297 A1   Oct. 28, 2021

Related U.S. Application Data

(63) Continuation of application No. PCT/CN2018/124641, filed on Dec. 28, 2018.

(51) Int. Cl.
*H04R 1/10* (2006.01)
*H04W 4/80* (2018.01)

(52) U.S. Cl.
CPC .......... *H04R 1/1033* (2013.01); *H04W 4/80* (2018.02); *H04R 2420/07* (2013.01)

(58) Field of Classification Search
CPC .... H04R 1/1033; H04R 2420/07; H04W 4/80
See application file for complete search history.

(56) References Cited

U.S. PATENT DOCUMENTS

| | | | |
|---|---|---|---|
| 11,153,701 B2* | 10/2021 | Sridharan | H04R 5/033 |
| 2016/0219358 A1* | 7/2016 | Shaffer | H04R 1/1016 |
| 2021/0092578 A1* | 3/2021 | Ryu | G06F 3/165 |

FOREIGN PATENT DOCUMENTS

CN   108419228 A   8/2018

OTHER PUBLICATIONS

The Office Action of CN Application No. 201880099931.8 dated Jun. 1, 2022.
The Search Report of CN Application No. 201880099931.8 dated Jun. 1, 2022.

* cited by examiner

*Primary Examiner* — Andrew L Sniezek
(74) *Attorney, Agent, or Firm* — Andrew C. Cheng

(57) ABSTRACT

A communication method for earphones which include a first earphone and a second earphone includes: the first earphone and the second earphone synchronously monitoring data sent from an intelligent terminal in a preset time sequence and performing feedback processing according to a data receiving condition; the first earphone sending out a first response signal if receiving the data; or the first earphone sending no response signal if not receiving the data; and the second earphone sending no response signal if receiving the data or the second earphone sending a second response signal if not receiving the data. By implementing embodiments of the present disclosure, the two earphones can synchronously receive data sent from the intelligent terminal, so that the communication reliability is improved. In addition, the two earphones give responses in different manners, so that power consumption of the earphones is reduced.

9 Claims, 5 Drawing Sheets

EARPHONE COMMUNICATION METHOD

FIELD

The present application relates to the technical field of communications, in particular to an earphone communication method.

BACKGROUND

With the popularization of Bluetooth products, True Wireless Stereo (TWS) earphones have a larger and larger market because of their convenience. Most TWS earphones communicate with intelligent equipment in the following manner: data such as music, speech, or data packets being transmitted to a master earphone via Bluetooth, and then the master earphone forwarding the data to a slave earphone.

The inventor found in the process of implementing the invention that the power consumption of the master earphone in the prior art is high and the master earphone and the slave earphone cannot synchronously receive data sent from the intelligent equipment.

SUMMARY

In view of the above-mentioned problems, the invention provides an earphone communication method to overcome the above-mentioned problems or at least part of the above-mentioned problems.

In one aspect, the present disclosure provides a communication method for earphones which comprise a first earphone and a second earphone. The communication method comprises:

the first earphone and the second earphone synchronously monitoring data sent from an intelligent terminal in a preset time sequence; and performing feedback processing according to a data receiving condition. Performing feedback processing comprises:

the first earphone sending a first response signal if the first earphone receives the data or the first earphone sending no response signal if the first earphone does not receive the data; and the second earphone sending a second response signal if the second earphone does not receive the data or the second earphone sending no response signal if the second earphone receives the data.

Optionally, the first response signal is a preset signal for triggering the intelligent terminal to send a next data packet.

Optionally, the second response signal is a preset signal for triggering the intelligent terminal to resend a current data packet.

Optionally, when the second response signal and the first response signal are sent synchronously, the first response signal is disturbed by the second response signal.

Optionally, the intensity of the second response signal sent by the second earphone is greater than that of the first response signal sent by the first earphone.

Optionally, when the second response signal and the first response signal are superposed, the signal to noise ratio of the first response signal is decreased.

Optionally, the earphone communication method further comprises verifying the data after the first earphone and the second earphone receive the data, and performing feedback processing according to the data receiving condition and a verification result.

Optionally, performing feedback processing according to the data receiving condition and a verification result comprises:

the first earphone sending the first response signal if the first earphone receives the data and the data is verified as correct or the first earphone sending no response signal if the first earphone does not receive the data or the data is verified as incorrect; and the second earphone sending no response signal if the second earphone receives the data and the data is verified as correct or the second earphone sending the second response signal if the second earphone does not receive the data or the data is verified as incorrect.

In another aspect, the present disclosure provides a pair of earphones including a first earphone and a second earphone. The first earphone communicates with the second earphone through the communication method mentioned above.

In the embodiments of the present disclosure, the first earphone and the second earphone synchronously monitor data sent from the intelligent terminal in a time sequence. When the first earphone receives the data, a first response signal is sent by the first earphone. If the first earphone does not receive the data, no response is given by the first earphone. When the second earphone receives the data, no response is given by the second earphone. If the second earphone does not receive the data, a second response signal is sent by the second earphone. The two earphones synchronously monitor the data sent from the intelligent terminal, so that the data transmission performance is improved, and the synchronization of the two earphones is guaranteed. Furthermore, the two earphones both have feedback mode of sending no response signal. Thus, power consumption of the two earphones is reduced. In the embodiments of the present disclosure, when both of the two earphones send response signals to the intelligent terminal at the same time, the first response signal is disturbed by the second response signal and will not be received by the intelligent terminal, so that the intelligent terminal can receive one kind of response signal at most and the response accuracy is improved.

The above description is merely a brief summary of the technical solution of the present disclosure. To more clearly explain the technical means of the present disclosure to allow those skilled in the art to implement the present disclosure according to the contents in the specification and to gain a better understanding of the above and other purposes, features and advantages of the invention, specific implementations of the present disclosure will be described below by way of examples.

BRIEF DESCRIPTION OF THE DRAWINGS

One or more embodiments will be illustratively described with reference to the corresponding drawings, but these illustrative descriptions are not intended to limit the implementations of the invention. Elements with the same reference numbers in the drawings are similar ones, and unless otherwise particularly stated, the drawings are not drawn in scale.

DESCRIPTION OF THE EMBODIMENTS

To make the purposes, technical solutions, and advantages of the implementations of the application clearer, the implementations of the application will be expounded in detail below in conjunction with the accompanying drawings. However, those ordinarily skilled in the art would appreciate that many technical details are provided in the implementations of the invention to allow readers to gain a better understanding of the application. But, the technical solutions protected by the application can also be realized based on different variations and modifications of the following implementations even without these technical details.

Figure 1:
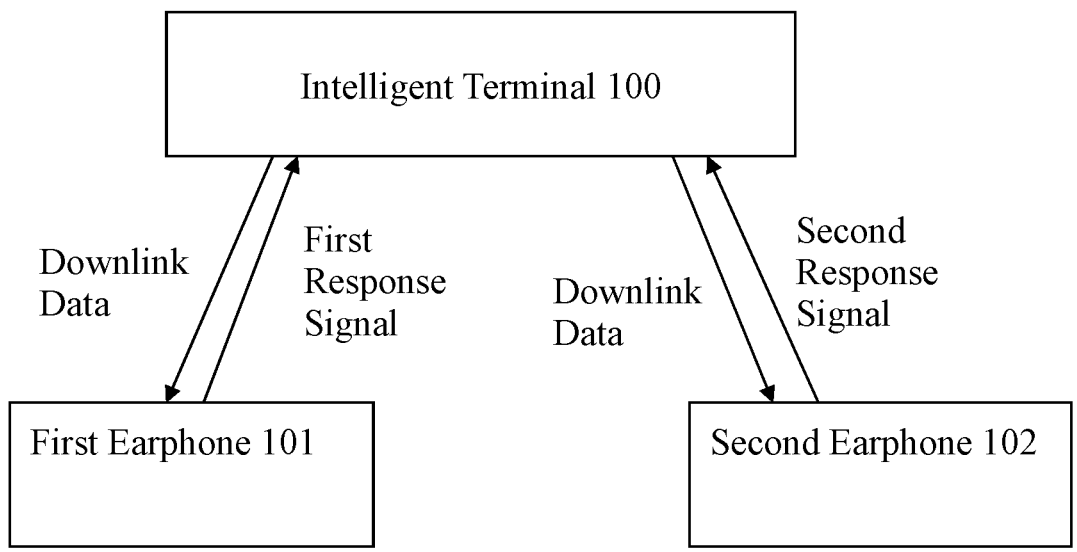
FIG. 1 is a schematic diagram of an earphone communication system according to an embodiment of the present disclosure.
Figure 2A:
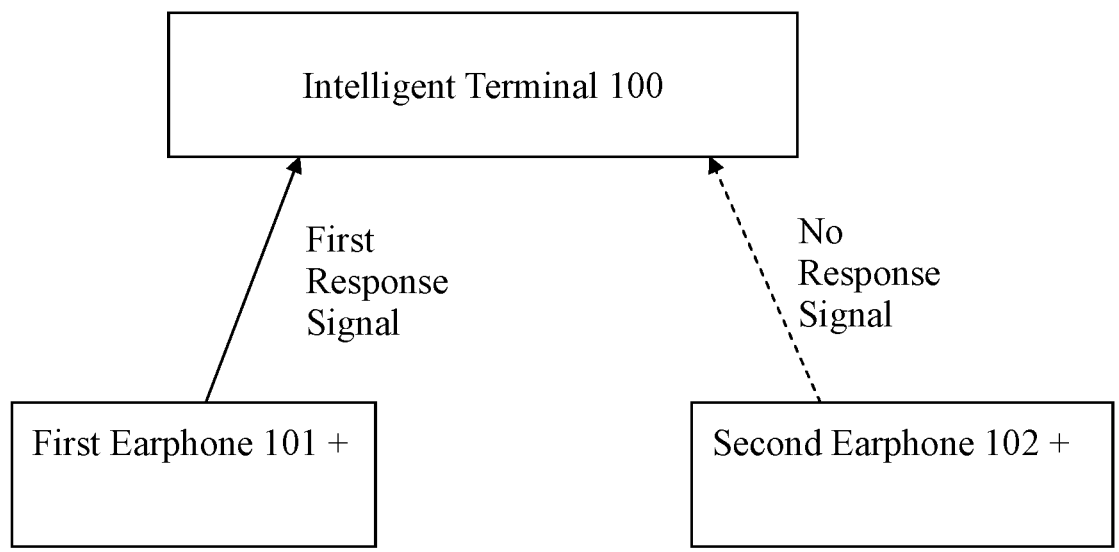
FIG. 2A is a schematic diagram of a first kind of feedback manner of an earphone communication method according to an embodiment of the application.
Figure 2B:
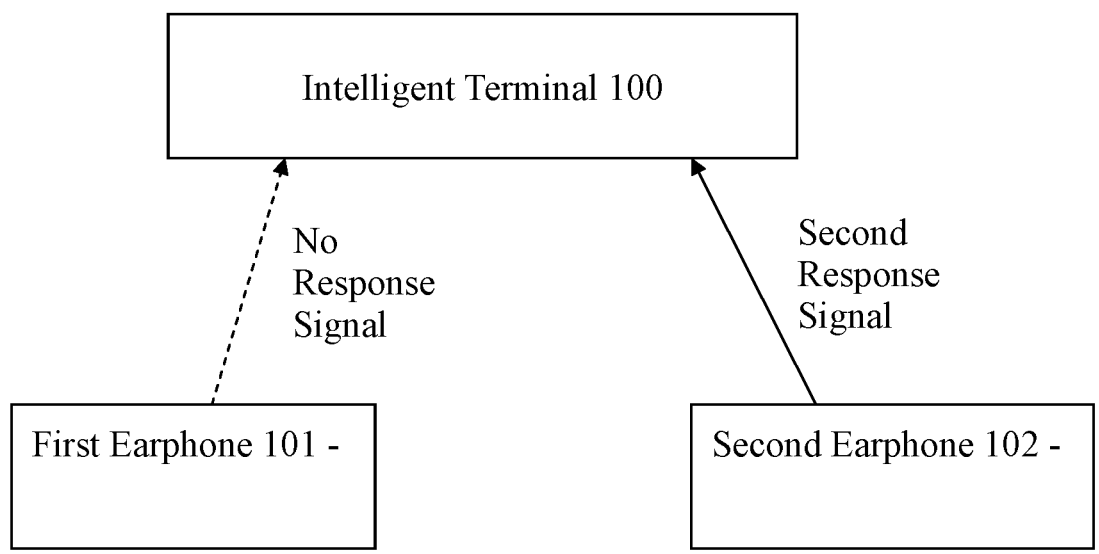
FIG. 2B is a schematic diagram of a second kind of feedback manner of the earphone communication method according to an embodiment of the application.
Figure 2C:
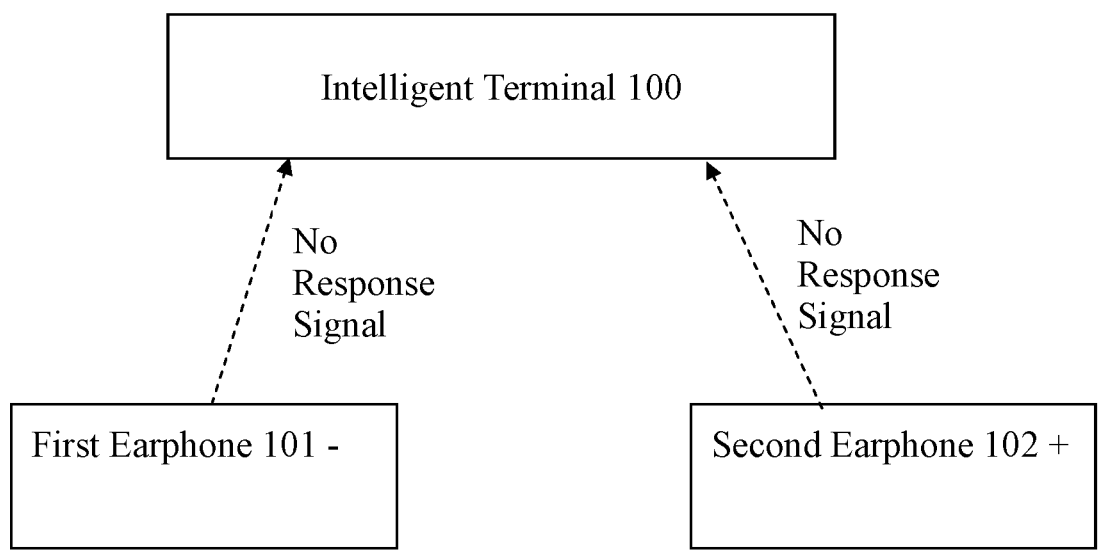
FIG. 2C is a schematic diagram of a third kind of feedback manner of the earphone communication method according to an embodiment of the application.
Figure 2D:
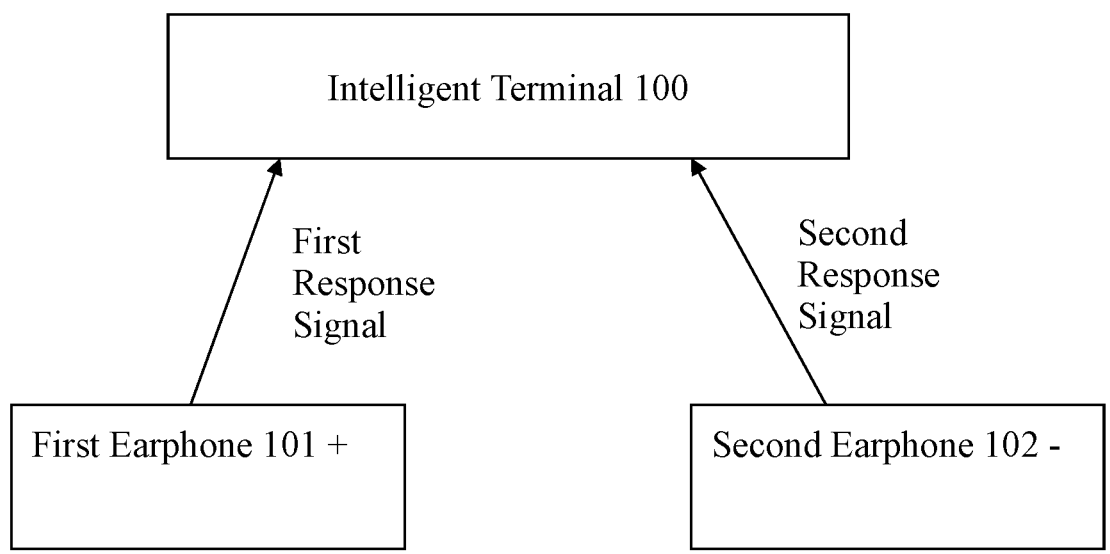
FIG. 2D is a schematic diagram of a fourth kind of feedback manner of the earphone communication method according to an embodiment of the application.

One illustrative embodiment of the application relates to an earphone communication system. As shown in FIG. 1, the earphone communication system comprises an intelligent terminal 100, a first earphone 101 and a second earphone 102. The first earphone 101 and the second earphone 102 are capable of communicating with the intelligent terminal 100, receiving downlink data sent from the intelligent terminal 100 and playing in response to the downlink data. The two earphones 101, 102 are capable of performing feedback processing after receiving the downlink data.

It is worth mentioning that the earphones may be any earphones that are able to communicate with the intelligent terminal 100. The communication modes of the earphones are not limited here, and may be Bluetooth communication, wireless network communication, or the like. The first earphone 101 and the second earphone 102 synchronously monitor data sent from the intelligent terminal 100, and the specific synchronization mode is not limited here, for example, the two earphones 101, 102 may be synchronous in a time sequence. For instance, under the condition that the two earphones communicate with the intelligent terminal 100 via Bluetooth and the first earphone 101 and the second earphone 102 are synchronous in a time sequence, the earphones are Bluetooth earphones. When the two earphones turn on, the first earphone 101 establishes Bluetooth connection with the intelligent terminal 100 to acquire address information of the intelligent terminal 100, the second earphone 102 establishes Bluetooth connection with the first earphone 101 such that the address information of the intelligent terminal 100 is copied to the second earphone 102. The address information of the intelligent terminal 100 includes a communication address of the intelligent terminal 100 and a Bluetooth connection code. The downlink data sent by the intelligent terminal 100 comprises an audio data packet sent to the earphones by the intelligent terminal 100. It should be understood that after acquiring the address information of the intelligent terminal 100, the second earphone 102 establishes connection with the intelligent terminal 100, and the first earphone 101 does not connect with the second earphone 102 anymore. When the intelligent terminal 100 sends the downlink data, the first earphone 101 and the second earphone 102 synchronously monitor the downlink data sent from the intelligent terminal 100 in a preset time sequence.

In some embodiments, the first earphone 101 and the second earphone 102 synchronously monitor data sent from the intelligent terminal 100 in a preset time sequences, and perform feedback processing according to the data receiving condition. If the first earphone 101 receives the data, a first response signal is sent by the first earphone 101; or, if the first earphone 101 does not receive the data, no response signal is sent by the first earphone 101. If the second earphone 102 receives the data, no response signal is sent by the second earphone 102; or, if the second earphone 102 does not receive the data, a second response signal is sent by the second earphone 102.

In some embodiments, when the second response signal and the first response signal are sent synchronously, the first response signal is disturbed by the second response signal.

In some embodiments, the intensity of the second response signal is greater than that of the first response signal.

In some embodiments, when the second response signal and the first response signal are superposed, the signal to noise ratio of the first response signal is decreased.

In some embodiments, the first response signal is an acknowledgement (ACK) signal, and the second response signal is a non-acknowledgement (NACK) signal.

It can be understood that, in the embodiments, the first earphone 101 and the second earphone 102 are not limited to specific earphones. When one of the two earphones is used as a first earphone, the other earphone is used as a second earphone. The first earphone 101 and the second earphone 102 are defined randomly.

Feedback processing in the embodiments includes the following four cases: the case where the earphones receive the data sent from the intelligent terminal is represented by "+", the case where the earphones do not receive the data sent from the intelligent terminal is represented by "−". The four cases are shown in FIG. 2A, FIG. 2B, FIG. 2C, and FIG. 2D, respectively.

2A: the first earphone 101 receives the data sent from the intelligent terminal 100, the second earphone 102 also receives the data sent from the intelligent terminal 100, the first earphone 102 send a first response signal back to the intelligent terminal 100, the second earphone 102 sends no response signal to the intelligent terminal 100. As a result, the intelligent terminal 100 receives the first response signal from the first earphone 101.

In this case, the two earphones both receive the data sent from the intelligent terminal 100, and feedback information received by the intelligent terminal 100 is the first response signal from the first earphone 101. The intelligent terminal 100 judges that a receiving terminal has received data sent from the intelligent terminal 100 as long as it receives the first response signal, and as a result the intelligent terminal 100 will send a next data packet. The first response signal is a preset signal for triggering the intelligent terminal 100 to send the next data packet, such as an ACK signal.

2B: the first earphone 101 does not receive the data sent from the intelligent terminal 100, the second earphone 102 does not receive the data sent from the intelligent terminal 100 either, the first earphone 101 send no response signal to the intelligent terminal 100 and the second earphone 102 sends a second response signal to the intelligent terminal 100. As a result, the intelligent terminal 100 receives the second response signal from the second earphone 102.

In this case, neither of the two earphones 101, 102 receives the data sent from the intelligent terminal 100 and feedback information received by the intelligent terminal 100 is the second response signal from the second earphone 102. The intelligent terminal 100 will judge that the receiving terminal has not received the data sent from the intelligent terminal 100 as long as it receives the second response signal, and as a result, the intelligent terminal 100 will resend a current data packet to the earphones. The second response signal is a preset signal for triggering the intelligent terminal 100 to resend the current data packet, such as a NACK signal.

2C: the first earphone 101 does not receive the data sent from the intelligent terminal 100, the second earphone 102 receives the data sent from the intelligent terminal 100, the first earphone 101 does not send a response signal to the intelligent terminal 100 and the second earphone 102 does not send a response signal to the intelligent terminal 100 either. As a result, the intelligent terminal 100 does not receive any response signals.

In this case, only the second earphone 102 receives the data sent from the intelligent terminal 100 and the intelligent terminal 100 does not receive any response signal. The intelligent terminal 100 will judge that the receiving terminal does not receive the data sent from the intelligent terminal 100 as long as it does not receive a response signal. As a result, the intelligent terminal 100 resends the current data packet to the earphones.

2D: the first earphone 101 receives the data sent from the intelligent terminal 100, the second earphone 102 does not receive the data sent from the intelligent terminal 100, the first earphone 101 sends the first response signal to the intelligent terminal 100 and the second earphone 102 sends the second response signal to the intelligent terminal 100.

In this case, the first earphone 101 sends the first response signal to the intelligent terminal 100 and the second earphone 102 sends the second response signal to the intelligent terminal 100. In an embodiment, the intensity of the second response signal is greater than that of the first response signal, so that the intelligent terminal 100 cannot recognize the first response signal and can only recognize the second response signal with a greater intensity. As a result, the intelligent terminal 100 resends the current data packet.

In some other embodiments of the invention, when the second response signal and the first response signal are superposed, the signal to noise ratio of the first response signal is decreased, so that the intelligent terminal 100 cannot recognize the first response signal. As a result, the intelligent 100 resends the current data packet to the earphones.

The embodiments of the present disclosure have the following beneficial effects: the first earphone and the second earphone synchronously monitor the data sent from the intelligent terminal in a time sequence, so that the two earphones monitor the data sent from the intelligent terminal at the same time, the data transmission performance is improved, the synchronization of the two earphones is guaranteed, and excessive power consumption of the master earphone is avoided. Furthermore, the two earphones both have a feedback mode of sending no response signal so that compared with other technical solutions that two earphones synchronously receive data from the intelligent terminal and only one earphone has a feedback mode of sending no response signal, power consumption of the earphones of the embodiments is reduced. For example, in some technical solutions, if the first earphone receives data, an ACK signal is sent out; or, if the first earphone does not receive data, a NACK signal is sent; and if the second earphone receives data, no response signal is sent; or, if the second earphone does not receive data, a NACK signal is sent out. Compared with such technical solutions, the two earphones in the embodiments of the present disclosure both have a feedback mode of sending no response signal so that the power consumption of the two earphones is reduced.

In some other embodiments of the present disclosure, in order to prevent the earphones from receiving incorrect data, the data will be verified after being received by the earphones, and feedback processing will be performed according to the data receiving condition and the verification result, wherein:

If the first earphone receives data and the data is verified as correct, the first response signal is sent by the first earphone; or, if the first earphone does not receive data or the data is verified as incorrect, no response signal is sent by the first earphone. If the second earphone receives data and the data is verified as correct, no response signal is sent by the second earphone; or, if the second earphone does not receive data or the data is verified as incorrect, the second response signal is sent by the second earphone.

It can be understood that verifying the data to obtain the verification result specifically refers to verifying the correctness of the data according to a verification value carried by the data when the earphones receive the data. Of course, other verification methods can also be adopted, and will not be described in detail here.

In some other embodiments, the specific feedback condition and the feedback information received by the intelligent terminal can be performed with reference to the second embodiment of the application, specifically:

When the first earphone receives the data and the data is verified as correct, and the second earphone receives the data and the data is verified as correct, the first earphone sends the first response signal to the intelligent terminal, the second earphone sends no response signal to the intelligent terminal. As a result, the intelligent terminal receives the first response signal from the first earphone.

When the first earphone does not receive the data sent from the intelligent terminal or the first earphone receives the data sent from the intelligent terminal but the data is verified as incorrect, and the second earphone does not receive the data sent from the intelligent terminal or the second earphone receives the data sent from the intelligent terminal but the data is verified as incorrect, the first earphone does not send any response signals to the intelligent terminal and the second earphone sends the second response signal to the intelligent terminal. As a result, the intelligent terminal receives the second response signal from the second earphone.

When the first earphone does not receive data sent from the intelligent terminal or the first earphone receives the data sent from the intelligent terminal but the data is verified as incorrect, and the second earphone receives the data sent from the intelligent terminal and the data is verified as correct, the first earphone does not send any response signals to the intelligent terminal and the second earphone does not send any response signals to the intelligent terminal. As a result, the intelligent terminal does not receive any response signals.

When the first earphone receives the data sent from the intelligent terminal and the data is verified as correct, and the second earphone does not receive the data sent from the intelligent terminal or the second earphone receives the data sent from the intelligent terminal but the data is verified as incorrect, the first earphone sends the first response signal to the intelligent terminal, and the second earphone sends the second response signal to the intelligent terminal.

The specific response process and processing carried out by the intelligent terminal after receiving feedback can be understood with reference to the first embodiment of the invention, and will no longer be described in details here.

Based on the earphone communication method provided by the embodiments of the present disclosure, the present disclosure further provides a pair of earphones which comprise a first earphone and a second earphone, wherein the first earphone communicates with the second earphone according to the earphone communication method described above, and the first earphone and the second earphone of this embodiment respectively correspond to the first earphone and the second earphone mentioned in the earphone communication method described above.

A great number of specific details are described in the specification of the present disclosure. However, it can be understood that the embodiments of the invention can be implemented without these specific details.

Similarly, it should be understood that in order to simplify the disclosure and help readers understand one or more aspects of the invention, in the description of the illustrative embodiments of the invention, the features of the inventions are sometimes grouped in one embodiment, figure, and description of the features. However, the method of the disclosure should not be construed as having the following intention, i.e., the invention claiming for protection including more features than those clearly defined in each claim. Or rather, as defined by the appended claims, the features of the claimed invention are less than all features of each embodiment disclosed above. Thus, claims corresponding to the specific embodiments should be clearly incorporated into the specific embodiments, wherein each claim can be used as an independent embodiment of the invention.

Those skilled in the art would appreciate that modules in the devices of one embodiment can be changed adaptively and can be configured in one or more devices different from those in this embodiment. The modules, units, or assemblies in one embodiment can be combined into one module, unit or assembly, or can be divided into multiple sub-modules, sub-units, or sub-assemblies. Except combinations in which at least some of the features and/or processes or units are contradictory to one another, any other combinations of the features and any methods disclosed or all processes or units of devices disclosed in the specification (including the accompanying claims, abstract, and drawings) will be available. Unless otherwise explicitly stated, each feature disclosed in the specification (including the accompanying claims, abstract, and drawings) can be replaced with an identical, equivalent, or similar alternative feature.

In addition, those skilled in the art would appreciate that although some embodiments described here include certain features rather than other features in other embodiments, the combinations of different embodiments should also fall within the scope of the invention and can form different embodiments. For example, any claimed embodiments in the appended claims can be freely combined.

It should be noted that the above embodiments are used to explain the invention, and are not intended to limit the invention, and those skilled in the art can design substitutive embodiments without departing from the scope of the appended claims. The term "comprise" does not exclude elements or steps that are not listed in the claims. The term "a" or "one" before elements does not exclude the presence of multiple such elements. The invention can be implemented by means of hardware comprising a plurality of different elements or by means of a proper programming computer or mobile phone.

Finally, it should be pointed out that the above embodiments are merely used to explain the technical solutions of the application, and are not intended to limit the application. Based on the conception of the application, the above embodiments or the technical features in different embodiments can be combined, the steps can be performed in any order, there exist many other variations in different aspects of the application, and for the sake of brevity, these variations are not described in detail. Although the application has been described in detail with reference to the above embodiments, those ordinarily skilled in the art would appreciate that the technical solutions described in the above embodiments can be modified, or part of the technical features in the above embodiments can be equivalently substituted, and none of these modifications or substitutions should cause corresponding technical solutions to depart from the scope of the technical solutions of the implementations.

What is claimed is:

1. A communication method for earphones which comprise a first earphone and a second earphone, the communication method comprising:
   the first earphone and the second earphone synchronously monitoring data sent from an intelligent terminal in a preset time sequence; and
   performing feedback processing according to a data receiving condition;
   wherein performing feedback processing comprises:
   the first earphone sending a first response signal if the first earphone receives the data or the first earphone sending no response signal if the first earphone does not receive the data; and
   the second earphone sending a second response signal if the second earphone does not receive the data or the second earphone sending no response signal if the second earphone receives the data.

2. The communication method according to claim 1, wherein the first response signal is a preset signal for triggering the intelligent terminal to send a next data packet.

3. The communication method according to claim 1, wherein the second response signal is a preset signal for triggering the intelligent terminal to resend a current data packet.

4. The communication method according to claim 1, wherein the first response signal is disturbed by the second response signal when the second response signal and the first response signal are sent synchronously.

5. The communication method according to claim 1, wherein an intensity of the second response signal is greater than that of the first response signal.

6. The communication method according to claim 1, wherein a signal to noise ratio of the first response signal is decreased when the second response signal and the first response signal are superposed.

7. The communication method according to claim 1, further comprising:
   verifying the data after the first earphone and the second earphone receive the data, and performing feedback processing according to the data receiving condition and a verification result.

8. The communication method according to claim 7, wherein performing feedback processing comprises:
   the first earphone sending the first response signal if the first earphone receives the data and the data is verified as correct or the first earphone sending no response signal if the first earphone does not receive the data or the data is verified as incorrect; and
   the second earphone sending no response signal if the second earphone receives the data and the data is verified as correct or the second earphone sending the second response signal if the second earphone does not receive the data or the data is verified as incorrect.

9. A pair of earphones, comprising a first earphone and a second earphone, wherein the first earphone communicates with the second earphone through a communication method which comprises:
  the first earphone and the second earphone synchronously monitoring data sent from an intelligent terminal in a preset time sequence; and
  performing feedback processing according to a data receiving condition;
  wherein performing feedback processing comprises:
  the first earphone sending a first response signal if the first earphone receives the data or the first earphone sending no response signal if the first earphone does not receive the data; and
  the second earphone sending a second response signal if the second earphone does not receive the data or the second earphone sending no response signal if the second earphone receives the data.

* * * * *